No. 791,018. Patented May 30, 1905.

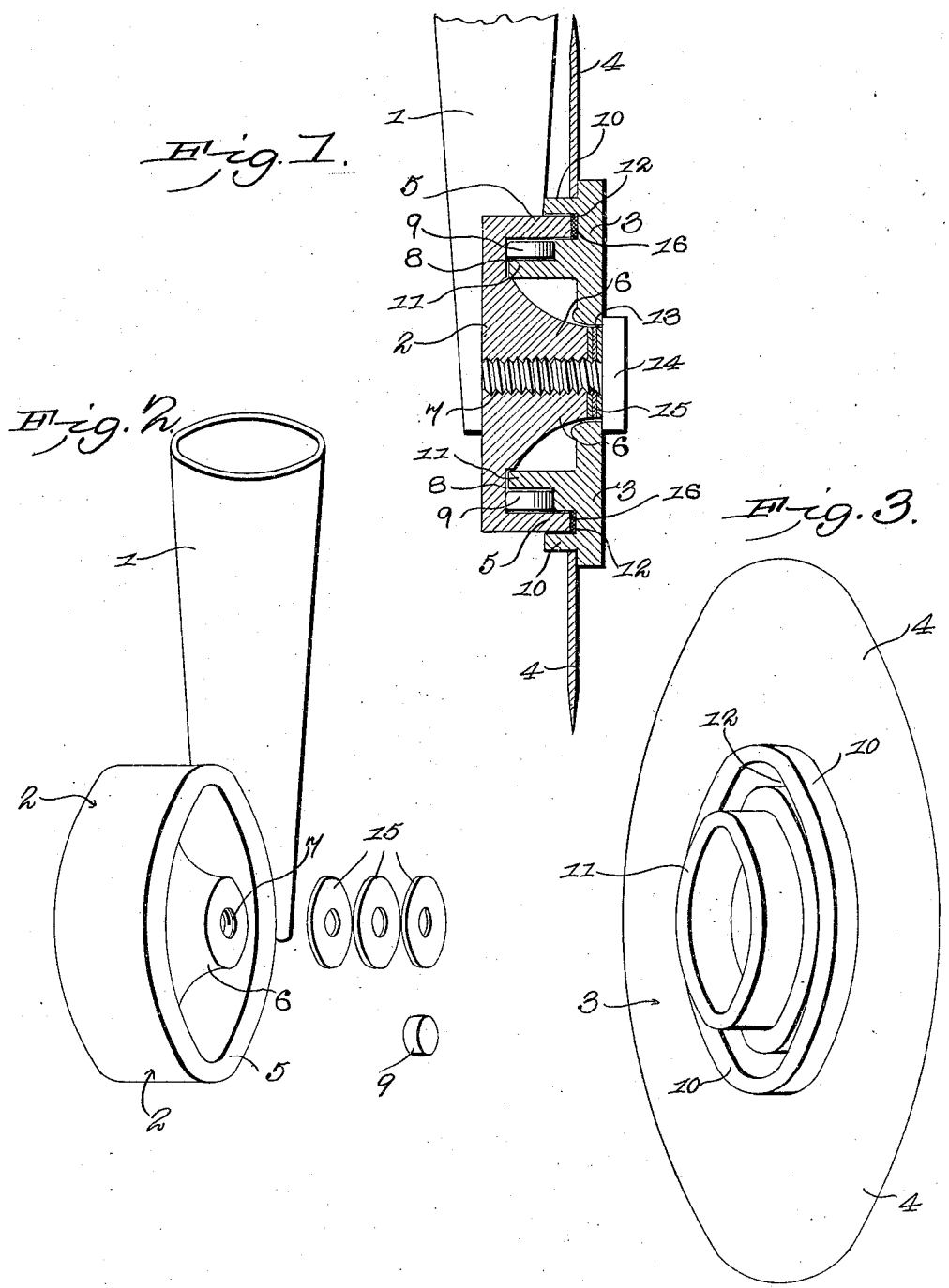

UNITED STATES PATENT OFFICE.

JACOB FAUST, OF GLADSTONE, MINNESOTA.

BEARING FOR DISK DRILLS.

SPECIFICATION forming part of Letters Patent No. 791,018, dated May 30, 1905.

Application filed August 16, 1904. Serial No. 220,930.

*To all whom it may concern:*

Be it known that I, JACOB FAUST, a citizen of the United States, residing at Gladstone, in the county of Ramsey and State of Minnesota, have invented a new and useful Bearing for Disk Drills, of which the following is a specification.

My invention relates to bearings for disks of seed-drills, and has for its objects to produce a comparatively simple inexpensive device of this character wherein the disk will rotate smoothly and evenly and one in which the parts of the bearing may be readily adjusted to compensate for wear.

To these ends the invention comprises the novel features of construction and combination of parts more fully hereinafter described.

In the accompanying drawings, Figure 1 is a central vertical section of the device embodying the invention and showing the parts of the bearing assembled. Fig. 2 is a perspective view of the seed-tube and the parts of the bearing carried thereby. Fig. 3 is a similar view of the disk and other parts of the bearing.

Referring to the drawings, 1 designates the seed-tube, to which is attached one part or section 2 of the bearing, while the other part or section, 3, is carried by and moves with the cutting disk or blade 4.

The part or section 2 of the bearing is in the form of a hollow box of annular form having a marginal flange or wall 5 and a central hub or cone 6, provided with a central screw-threaded opening 7, there being formed between the wall 5 and hub 6 a groove or runway 8 for the reception of antifriction devices 9, preferably in the form of rollers, while the hub 6 has a substantially conical portion the inclined walls of which are slightly concaved, as shown.

The section 3 of the bearing has an outer annular flange 10, which in practice lies upon the outer face of the flange or wall 5, and an inner annular flange 11, which fits around the hub or cone 6, there being provided in the section 3 and immediately around the inner face of the flange 10 a groove or recess 12, in which the inner edge of the flange 5 seats, while through the center of the section 3 is formed an opening 13, in which the truncated end of the cone 6 fits and which receives a connecting and adjusting screw 14, tapped into the opening 7, there being arranged between the head of the screw and the end of the cone a series of removable washers 15 for a purpose which will presently appear, while within the groove or channel 12 there is disposed a packing 16, of felt or analogous material, adapted to render the bearing dust-proof.

In practice the edge of the flange 5 seats in the groove 12, while the edge of the flange 11 seats in the groove 8, and the rollers 9 travel in the space or runway produced between said flanges, while the end of the cone 6 fits into the opening 13, the marginal wall of which is suitably shaped to conform to the wall of the cone. Under this construction the disk will be firmly and evenly supported and will rotate with great freedom, while the parts may be readily adjusted to compensate for wear by means of the screw 14, from which when manipulated for drawing the parts of the bearing together the washers 15 may be removed as circumstances require.

From the foregoing it is apparent that I produce a simple inexpensive device which will efficiently perform its functions to the ends in view, it being understood that minor changes in the details herein set forth may be resorted to without departing from the spirit of the invention.

Having thus described the construction and operation of my invention, what I claim as new, and desire to secure by Letters Patent, is—

In a device of the class described, a supporting member having an annular flange and a centrally-disposed truncated conical projection provided with a threaded recess, a disk-carrying member having a packing-groove for the reception of the annular flange of the opposing member, said disk-carrying member being also provided with a flange externally engaging the annular flange of the opposing member and with an inner flange spaced apart from the flange of said opposing member, antifriction members disposed in the space or runway between said flanges, and a headed connecting-screw threaded into the conical projection.

In testimony that I claim the foregoing as my own I have hereto affixed my signature in the presence of two witnesses.

JACOB FAUST.

Witnesses:
    JOHN CONRADI,
    J. R. BLACKWELL.